(12) United States Patent
Levenson (10) Patent No.: US 6,496,634 B1
(45) Date of Patent: Dec. 17, 2002

(54) HOLEY FIBERS FILLED WITH RAMAN ACTIVE FLUID

(76) Inventor: Marc David Levenson, 19868 Bonnie Ridge Way, Saratoga, CA (US) 95070

( * ) Notice: Subject to any disclaimer, the term of this patent is extended or adjusted under 35 U.S.C. 154(b) by 0 days.

(21) Appl. No.: 09/907,241

(22) Filed: Jul. 17, 2001

(51) Int. Cl.[7] .............................. G02B 6/02; G02B 6/20
(52) U.S. Cl. ...................... 385/125; 385/27; 359/341.1; 359/341.3; 359/342; 359/334
(58) Field of Search ................ 385/125, 27; 359/341.1, 359/341.3, 342, 334

(56) References Cited

U.S. PATENT DOCUMENTS

2002/0118938 A1 * 8/2002 Hasegawa .................. 385/125

OTHER PUBLICATIONS

J.H.Lee, et al., "A Holey fibre Raman amplifier and all-optical modulator", ECOC 2001, pp. 46–47, Sep. 2001.*
Z.Yusoff, et al., "Raman effects in a highly nonlinear holey fiber: amplification and modulation", Optics Letters, 27(6), pp. 424–426, Mar. 2002.*

* cited by examiner

Primary Examiner—Cassandra Spyrou
Assistant Examiner—Leo Boutsikaris
(74) Attorney, Agent, or Firm—Rodney T. Hodgson (57) ABSTRACT

Hollow core or "holey" optical fibers are filled with a gas or liquid which exhibits high Raman gain. Such gases as hydrogen and hydrogen isotopes are preferred embodiment. When these fibers are pumped with a pump laser, signals at an appropriate frequency carried by the fiber may be amplified, attenuated, changed to a different frequency, or mixed with other signals.

34 Claims, 6 Drawing Sheets

HOLEY FIBERS FILLED WITH RAMAN ACTIVE FLUID

FIELD OF THE INVENTION

The field of the invention is the field of optical communications and optical fiber transmission and control of light signals.

BACKGROUND OF THE INVENTION

The field of fiber optic communications has exploded in the last thirty years with inventions which provide optical fibers with low loss over hundreds of kilometers, lasers which are reliable and long lived, and optical amplifiers which remove the need to convert optical signals to electrical signals for amplification and reconversion back to optical signals.

The most common types of optical amplifier are short lengths (1 to 10 meters) of optical fiber doped with ions (typically erbium) which provide gain for optical signals when pumped with a pump laser. The short length of amplifying fiber are spliced into the long length passive fibers which carry the optical signals for tens to hundreds of kilometers between amplification steps. Other optical amplifiers make use of the Raman gain in the silica of the optical fiber. There is no doping of amplifying ions into the silica, since the non-linear properties of the silica itself are used for the amplification.

One recent development of optical fibers is the development of holey fibers, where the fibers are produced with voids or holes filled with air. The holey fibers produce different dispersion characteristics in the optical fibers. References pertinent to the above prior art are: E. J. Woodbury and W. K. Ng, Proc. IRE 50, 2347 (1962); E. J. Woodbury and G. M. Eckhardt, U.S. Pat. No. 3,371,265 (Feb. 27, 1968); M. D. Levenson and S. S. Kano, "Introduction to Nonlinear Laser Spectroscopy, Revised Edition," Academic Press (San Diego 1988); Y. R. Shen, "Principles of Nonlinear Optics," John Wiley & Sons (New York, 1984); G. P. Agrawal, "Nonlinear Fiber Optics," Academic Press (San Diego, 1989); A. M. Zheltikov, "Holey Fibers", Physics—Uspekhi 43, (11) 1125–1136 (2000), Hecht, J.,"Holey fibers cut their losses", Technology Review, Apr. 17, 2001; Kafka, et al., U.S. Pat. No. 6,236,779, and Islam, et al., U.S. Pat. No. 6,239,903. The above references and patents are hereby incorporated by reference, including incorporated material.

OBJECTS OF THE INVENTION

It is an object of the invention to produce optical fiber control means to control optical signals. It is an object of the invention to produce optical fiber control means to amplify optical signals. It is an object of the invention to produce optical fiber control means to attenuate optical signals. It is an object of the invention to produce optical fiber control means to control optical signals selectively, so that one or more optical signals of a large plurality of signals are controlled while others of the plurality are not controlled. It is an object of the invention to produce optical fiber control means to control dispersion of optical signals. It is an object of the invention to produce optical fiber control means to shift power from one optical signal to another optical signal. It is an object of the invention to produce optical fiber control means to perform logical operations on two optical signals. It is an object of the invention to produce optical fiber apparatus to control optical signals. It is an object of the invention to produce optical fiber methods to control optical signals. It is an object of the invention to produce optical fiber systems to control optical signals.

SUMMARY OF THE INVENTION

The present invention is a system, apparatus and method of use of an optical fiber having voids in the cladding and/or core, wherein the voids are filled with a fluid having non-linear optical properties for the control of light signals. Non linear optical properties are anticipated to be Raman gain for amplifying or attenuating optical signals, and resonant and non-resonant non-linear index of refraction for 4 wave parametric generation, amplification, and control of optical signals.

DETAILED DESCRIPTION OF THE INVENTION

Figure 1:
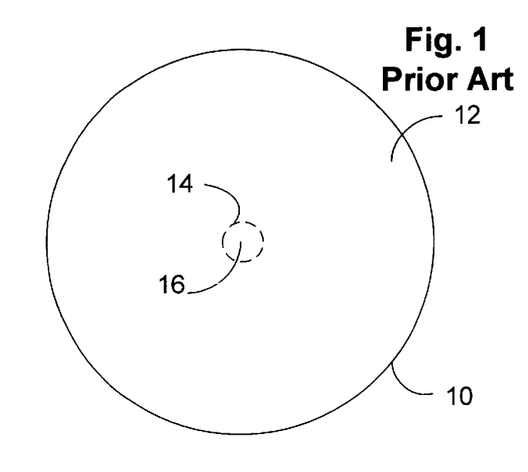
FIG. 1. shows a cross section of a prior art optical fiber.

FIG. 1 shows a cross section of a prior art optical fiber 10. The fiber 10 has a cladding region 12 surrounding a core region 16. The boundary 14 between the core and cladding region may be sharp or diffuse. The core region 16 generally has an index of refraction for light of the signal frequency $f_1$, greater than the index of refraction of the cladding region 12. Light propagating in the core is constrained by total internal reflection from the boundary 14 to propagate within the core. If the diameter of the core is correctly chosen (in the region of microns for light of wavelength 1.5 microns), only a single mode will propagate in the fiber.

Figure 2:
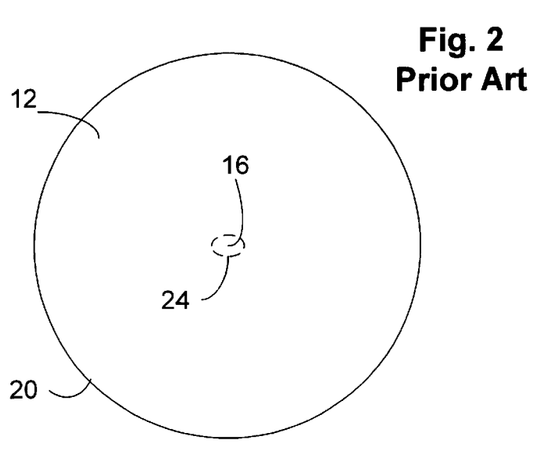
FIG. 2. shows a cross section for a prior art single mode polarization preserving fiber.

FIG. 2 shows a cross section for a prior art single mode polarization preserving fiber. The core 16 has an elliptical or other non-axi-symmetric profile as shown by the core cladding boundary 24.

Figure 3:
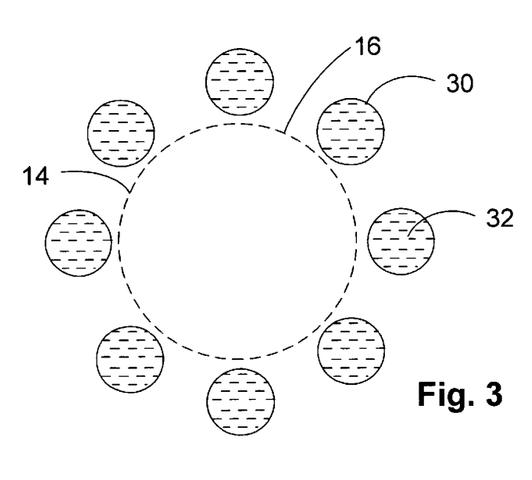
FIG. 3. shows a cross section of a "holey fiber"

A recent introduction to the field: of optical fibers is shown by the cross section shown in FIG. 3. Holes or voids 30 are produced in the core and/or cladding. Prior art cladding has the voids filled with air. The air has a dielectric constant substantially less than the dielectric constant of the silica ($SiO_2$) material used for the fiber, so the average index of refraction of the cladding may be less than the core 16, even though the same material is used for the core and cladding.

The first embodiment of the optical fiber of the invention has the voids or holes 30 of the prior art fiber filled with a fluid 32 which may interact with the light propagating in the fiber in a non-linear way. Light propagating in the core 16 of the fiber has part of the electric field of the electromagnetic radiation penetrating into the fluid 32 as an evanescent wave.

In a preferred embodiment the fluid is a molecular gas or vapor such as $H_2$ or $D_2$ with a Raman active vibration but no absorption of the light propagating in the fiber. The linear index of refraction of such a fluid is essentially the same as that of air or vacuum and thus does not perturb the linear propagation of light in the holey fiber. As a result, prior art fiber designs created for empty voids also function properly in this preferred embodiment.

The holes or voids in the fiber may be spherical or other shapes as determined by the manufacturing process. The most preferred shape of the holes or voids are elongated holes with the elongation axis in the direction of the axis of the fiber. Such holey fibers are produced at present by bundling a series of glass tubes together, then heating and drawing the bundle down with normal glassblowing and fiber drawing techniques as are known in the art of manufacture of optical fibers. In particular, the highest purity and lowest loss fibers are made by chemical vapor deposition of silica or silica doped with materials such as germanium. The material is deposited on the inside surface of a tube, and a hole is necessarily left in the tube. Normally, the hole closes when the tube is drawn down to a fiber, but if the hole is filled, for example with a high pressure gas, and the tube ends closed, then the hole will not close upon drawing, and the high pressure gas will remain inside the hole in the center of the tube. The pressure of gas in the tube is preferably from 1/100 atmosphere to 100 atmospheres. More preferably, the pressure of gas is from 1/10 atmospheres to 50 atmospheres. Even more preferably, the pressure is from 0.9 atmospheres to 20 atmospheres. Most preferably, the pressure is from 1.5 atmospheres to 10 atmospheres. The most preferably gas is hydrogen or a gas containing a hydrogen isotope.

Tubes drawn down may contain a gas such as air or an inert gas such as argon which serves to keep the holes open upon drawing. After drawing, the ends of the fibers may be cut and the gas in the tube may be withdrawn by vacuum action. Then the fiber may immersed in a gas of the appropriate pressure or a liquid. Capillary action will draw the liquid into the hole in the tube and fill the fiber with the non-linear liquid.

Holes in the tube may also be filled by heating the finished tube in a high pressure gas. The gas diffuses through the silica walls of the tube. This method of filling voids in glass is well known in the art of producing targets for nuclear fusion studies.

Figure 4:
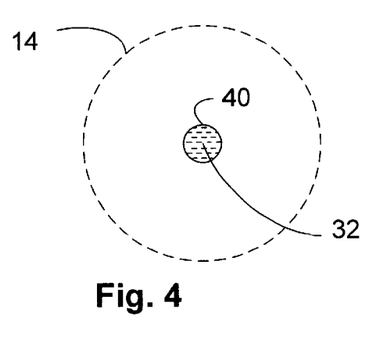
FIG. 4. shows the core region of an optical fiber with a hole in the center of the core.

FIG. 4 shows the core region 16 of an optical fiber with a hole 40 in the center of the core. A second embodiment of the invention shows a non linear fluid material 32 which fills the hole 40. The relative diameter of the core region 16 and the hole 40 show that the hole has a diameter on the order of the wavelength of light, so that light penetrates the hole 40 as an evanescent wave.

Figure 5:
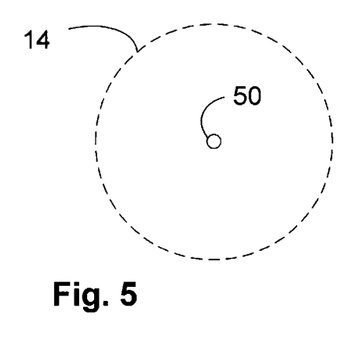
FIG. 5. shows the core region of an optical fiber with a hole in the center of the core.

FIG. 5 shows the core region 16 of an optical fiber with a hole 50 in the center of the core. The relative diameter of the core region 16 and the hole 40 show that the hole has a diameter less than the wavelength of light. If the hole 50 has a sufficiently small diameter, light will not be scattered from the hole 50 and so will propagate further than light which scatters from non uniformities having dimensions on the order of the wavelength of light.

Figure 6:
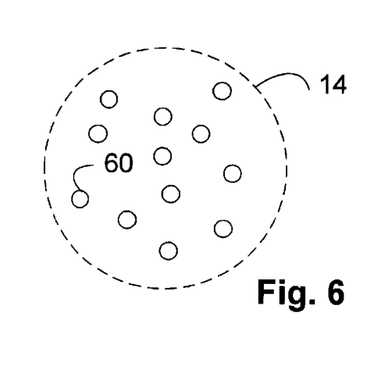
FIG. 6. shows an embodiment of the invention.

FIG. 6 shows an embodiment of the invention where the fluid filled holes are randomly distributed through the core region of the fiber.

Figure 7:
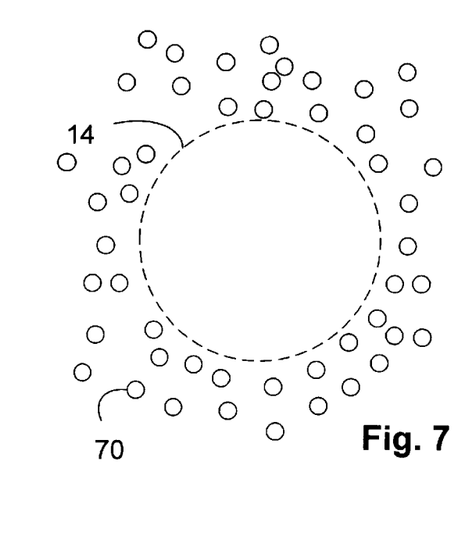
FIG. 7. shows an embodiment of the invention.

FIG. 7 shows an embodiment of the invention where the fluid filled holes are randomly distributed through the cladding region of the fiber.

Figure 8:
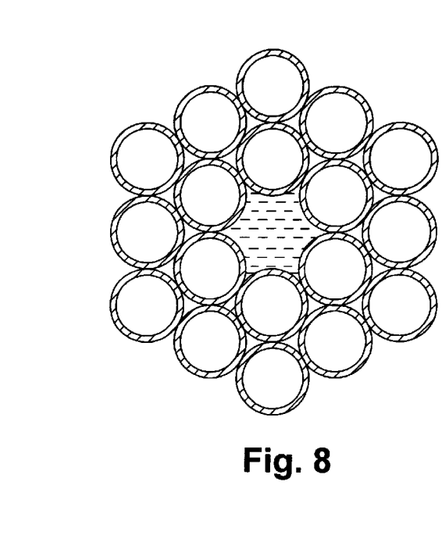
FIG. 8. shows the most preferred embodiment of the invention.

FIG. 8 shows the most preferred embodiment of the invention where the fiber is drawn down from a number of tubes to form a fiber with central region as shown in the diagram. FIG. 8 shows a void in the center of the fiber which is shown filled with a fluid, which in the most preferred embodiment a hydrogen isotope. However, in the drawing process a number of tubes are stacked together and drawn, and all the open spaces inside the tubes and between the tubes and in the center where a tube is missing may filled with hydrogen or another gas or fluid. Instead of a single hole shown in FIG. 8 in the center of the fiber, a number of fluid filled holes in the core and/or cladding could be used to the same purpose.

FIG. 8 shows a regular array of holes, which is the most preferred embodiment.

The threshold pump power need not be very high. In the case of the hydrogen Q1 Raman transition at 4155 $cm^{-1}$, the Raman gain $G_R$ is independent of pressure (for pressures above ~3 atmospheres) and equals $1.5 \times 10^{-5}$ m/M W.A 1W laser coupled into the 8 $\mu$m diameter core of an optical fiber has an intensity of $I_P = 2 \times 10^4$ $MW/m^2$, which implies a Raman gain coefficient of $G_R I_P = 0.3$ $m^{-1}$. In this ideal case, the signal wave would grow by a factor of e=2.7 for every 3.3 m of propagation down the fiber! Thirty dB of amplification would only require~23 m! this ideal case would require an optical fiber in which all the light propagates down a void—a so-called "perfect mirror". Such a fiber is shown in FIG. 8. More generally, the gain is reduced by an "overlap" or "filling" factor $f_F < 1$ which parameterizes the portion of the optical beams interacting with the Raman medium in the voids. Even if $f_F = 0.01$, 30 dB amplification would only require 2.3 km of optical fiber with 1 W of pump and voids filled with hydrogen.

To amplify an optical communications signal in the 1550 nm band requires a pump wavelength shifted to higher frequency by the Raman transition frequency: 4155 cm$^{-1}$ (or 138.5 THz) for $H_2$. The required pump wavelength then is 942.8 nm, which is easily produced at the required power level by semiconductor lasers. A monochromatic pump wavelength, however, would amplify a band of frequencies only as wide as the stimulated Raman gain band of the gas. In the case of $H_2$, that band can be quite narrow; if the pump and signal waves propagate in the same direction through an optical fiber, the Doppler broadening of the gas cancels, resulting in a gain linewidth as small as 250 MHz at 2.5 atm. of $H_2$ pressure! Higher pressure is thus desirable as is choosing opposite directions for the pump and signal wave propagation. The pump and signal wavelengths can be readily split from one another using interference filters and other prior-art devices since their respective wavelengths are so different. The relatively narrow gain bandwidth allows the amplification of single communications channels to be switched on and off by switching the corresponding pump wavelengths on and off. In another preferred implementation, the pump wavelength can be tuned to select the channel to be amplified. In yet another preferred implementation, multiple laser switch the amplifications of multiple signal channels spaced in frequency on and off independently. In yet another preferred implementation, the gains of individual channels are varied independently by increasing or decreasing the powers of the corresponding pump lasers in order to control the signal levels in the communications system. Because the response time of a Raman amplifier is the transit time of the light through the device, this implementation can provide faster responses than prior gain control technologies. Combining a single optical channel amplifier based on this vapor filled Raman amplification technology with a fixed attenuator for the signal results in an fast optical switch that can rapidly shift the signal level of a given channel by 30 dB from the amplifier-on to the amplifier-off state by means of turning the pump laser on and off.

Figure 9:
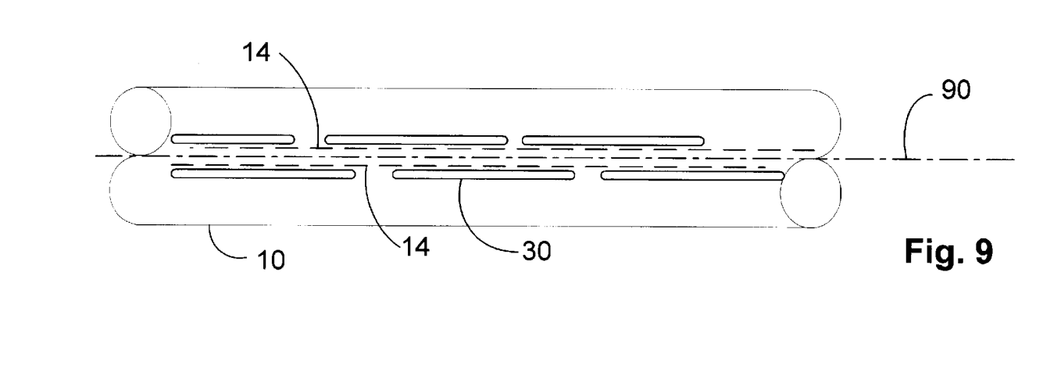
FIG. 9. shows a cross section of a length of fiber.

FIG. 9 shows a cross section of a length of fiber 10 with holes 30 in the cladding material elongated in the direction of the fiber axis 90. While a number of holes 30 having a relatively short length of little more than the fiber diameter is shown, it is anticipated by the inventor that the holes 30 will be very long, and may stretch the entire length of one manufactured fiber which may be hundreds of meters to kilometers in length. For specialty operations the invention calls for fibers with sufficient length for amplification, attenuation, parametric generation, and logic operations. These fibers may range in length from around 10 cm to 1 meter to hundreds of meters.

Figure 10:
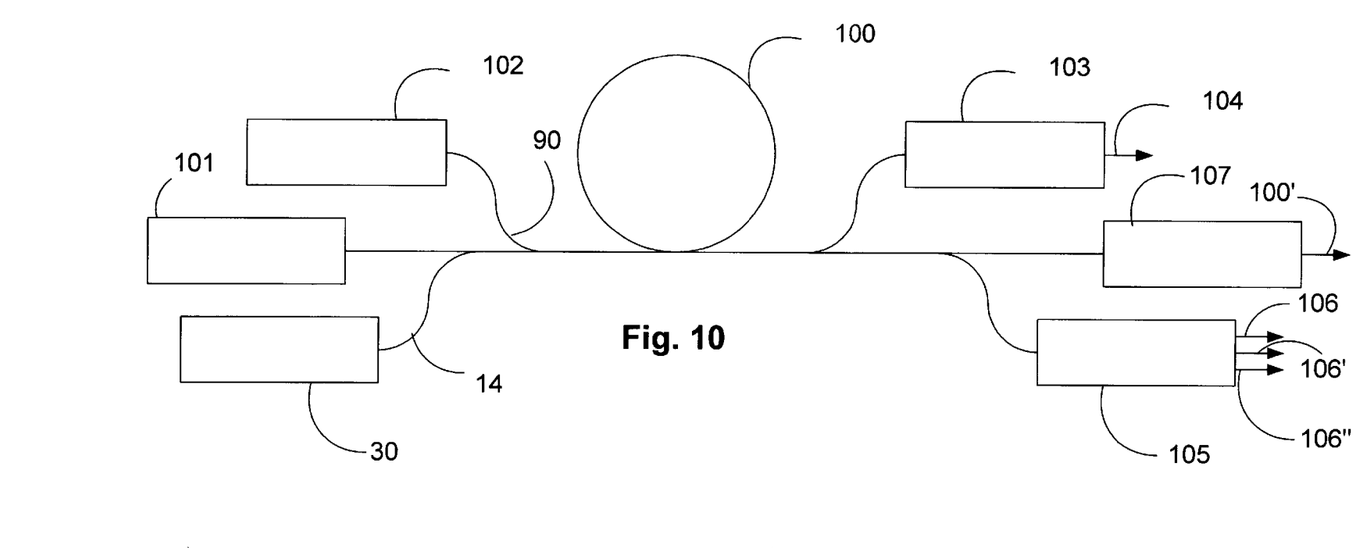
FIG. 10. shows a sketch of a system for using the fluid filled optical fiber of the invention.

FIG. 10 shows a sketch of a system for using the fluid filled optical fiber of the invention. The loop 100 schematically depicts an optical fiber section of an optical communication system. The length of the fiber 100 may range from centimeters to hundreds of kilometers. Typically, a means 101 is used to inject light of frequency $f_1$ into the fiber. The light of frequency $f_1$ is usually modulated as a string of pulses with appropriate bandwidth that the pulses have pulse length in the nanosecond or subnanosecond region. Means 102 may be used to inject one or more other frequencies in addition to light of frequency $f_1$ into the fiber. Means 103 may be used to detect light of frequency $f_1$ and to produce a string of electrical pulses sent on line 104 for further treatment. Means 105 may be used to separate light of frequency $f_1$ from other frequencies, and to send light of frequency $f_1$ and/or light of other frequencies as light pulses to other optical fibers 106', 106", and 106'''. Means 107 may be used to amplify light of frequency $f_1$ and/or light of other frequencies, and send the amplified light signals into another fiber length 100'

Figure 11:
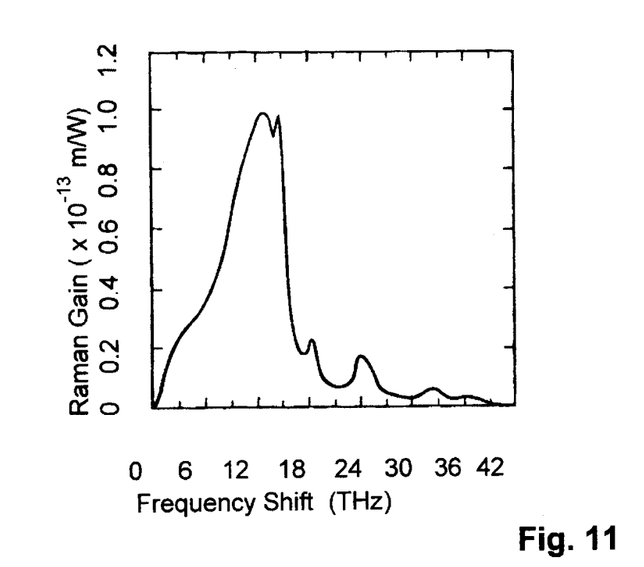
FIG. 11 shows the gain as a function of wavelength for a Raman amplifier in fused silica.

Prior art amplification means 107 include an optical fiber doped with an ion such as erbium. When pumped with light of the correct frequency, the erbium ions will be excited and there will be gain for signals of light of frequency $f_1$. Recently, it has been shown that the Raman effect can be used to amplify light of frequency $f_1$ in a broader bandwidth than possible with erbium doped fiber. FIG. 11 shows the gain as a function of wavelength for such a Raman amplifier in fused silica.

Figure 12:
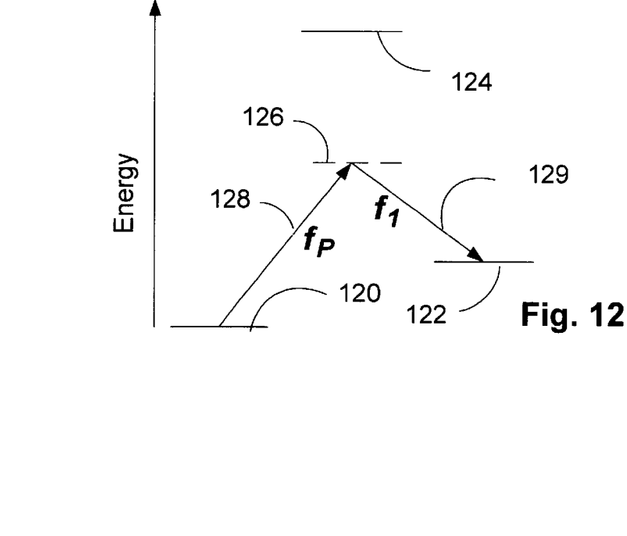
FIG. 12 shows an energy diagram for Raman scattering.

The Raman effect can be understood with respect to the energy level diagram of a material shown in FIG. 12. A ground, or lowest energy, state 120 is shown, along with a first excited state 122 and a second excited state 124. State 120 and 124 are optically connected, in that there is a large oscillator strength for the optical transition from state 120 to state 124. States 124 and 122 are also strongly connected. Note that states 120 and 122 are often not strongly optically connected, as the same quantum rules which strongly allow transitions between states 120 and 124 and between 124 and 122 explicitly disallow transitions between states 120 and 122. (This is often the case for small and symmetric molecules). When a strong pump light field of photons of frequency $f_P$ interacts with the material, a population in virtual state 126 is created. Since there is generally no population in state 122, there is a population inversion between virtual state 126 and state 122, and there will be gain on the transition from virtual state 126 to state 122, and light of frequency will be amplified if $f_P-f_1=f_R$, where $f_R$ is the Raman shift of the material given by the energy difference between states 122 and 120 in frequency units.

Figure 13:
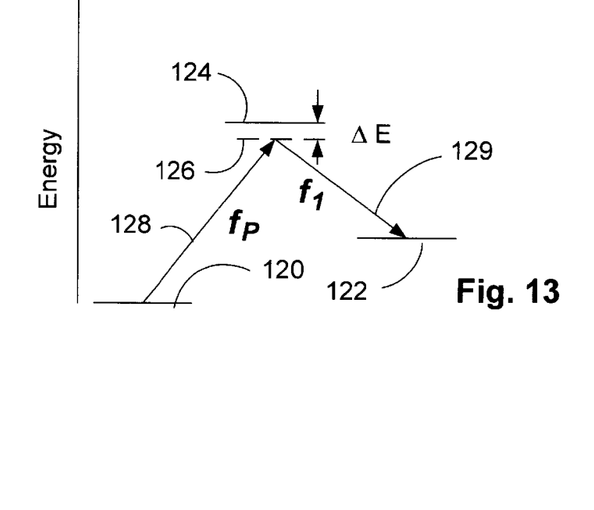
FIG. 13 shows an energy diagram for Raman scattering.

The material may be chosen to have an energy level diagram as shown in FIG. 13, where the real state 124 is close in energy to the virtual state 126. The Raman gain is inversely proportional to the difference in energy $\Delta E$ of these two states 124 and 126.

Figure 14:
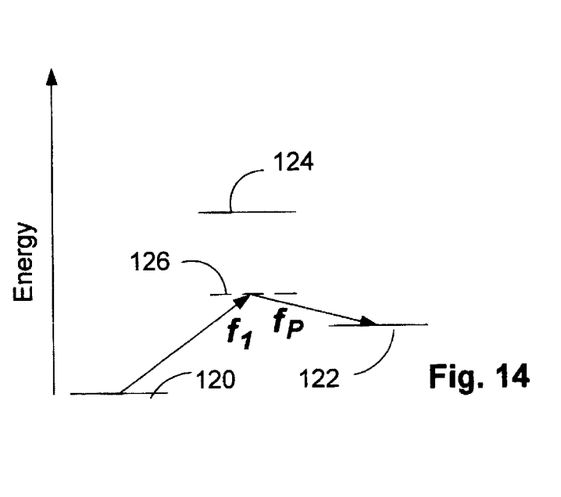
FIG. 14 shows a Raman gain system be used to attenuate a signal frequency $f_1$.

FIGS. 12 and 13 show that a pump frequency $f_P$ which is larger than a signal frequency $f_1$ may be used to transfer energy from the pump field to the signal field. For every photon gained in the signal field, a photon from the pump field is destroyed, and a real state 122 is left populated. However, FIG. 14 shows that a Raman gain system may be used to attenuate a signal of frequency $f_1$ if the pump signal $f_P$ has lower frequency than the signal frequency. In this case, photons in the signal field are destroyed, and photons are created in the pump field. Thus, a signal $f_1$ may be either amplified or attenuated in a Raman gain system.

Figure 15:
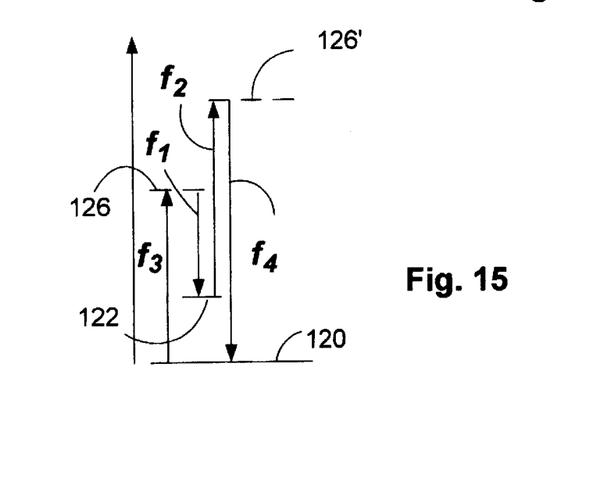
FIG. 15 shows a further embodiment of a non linear system.

FIG. 15 shows another non linear Raman gain system where a signal $f_1$ may be controlled by a 4 wave parametric process. Pump photons $f_3$ and $f_4$ may interact with signal photons $f_1$ and $f_2$ through virtual states 126 and 126' to transfer energy from $f_1$ to $f_2$. In this case, all radiation must be propagating so that the phase velocity of the non-linear polarization created at frequency $f_2$ by $f_1$, $f_3$ and $f_4$ is phase matched to the freely propagating wave at $f_2$ so that the coherence length is greater than one half the length of the optical fiber.

Figure 16:
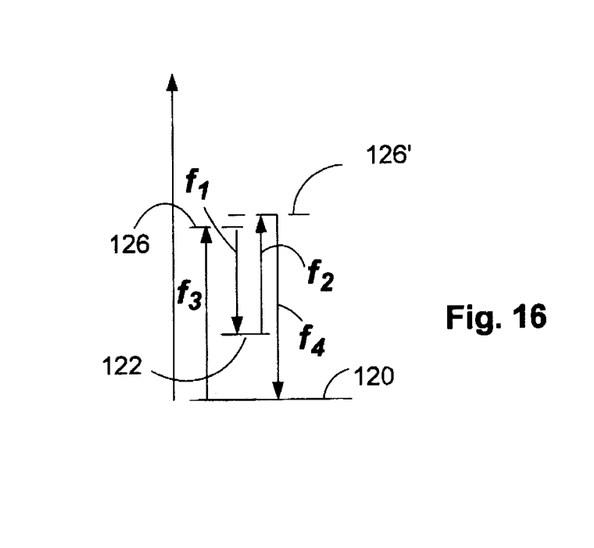
FIG. 16 shows a system where energy is transferred from the signal frequency $f_1$ to $f_2$.

FIG. 16 shows a system similar to that of FIG. 15 where energy is transferred from the signal frequency $f_1$ to another frequency $f_2$ which is close to $f_1$. The system of FIG. 16 is very useful for transferring energy between closely spaced frequencies in a communication system. The system of FIG. 16 is especially useful if there is a close lying real state to 126 and 126', since the 4 wave parametric coefficients will then be increased.

Figure 17:
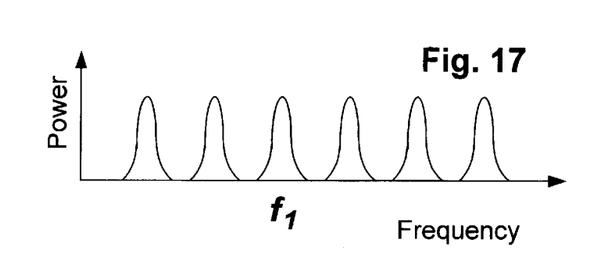
FIG. 17 shows the power output spectrum of a typical communication fiber.
Figure 18:
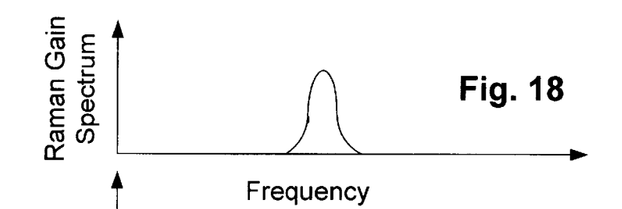
FIG. 18 shows a Raman gain curve.

FIG. 17 shows the power output spectrum of a typical communication fiber carrying a number of frequencies simultaneously. As an example, we treat just one frequency labeled $f_1$ in the diagram. If we inject a pump laser with frequency $f_P$ into the fiber of the invention, and the Raman gain curve is shown as in FIG. 18, the output of the fiber of the invention is sketched in FIG. 19, where there is a power scale change between FIG. 17 and FIG. 19. If the Raman gain spectrum is sufficiently narrow, only the frequency $f_1$ will be amplified, and a detector set to reject signals under a certain threshold will measure only signals of frequency $f_1$.

Figure 19:
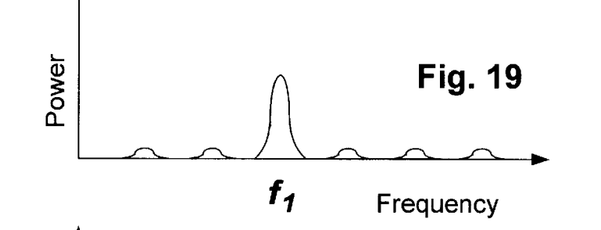
FIG. 19 shows the output spectrum of the fiber of the invention when the signals of FIG. 17 pass through the Raman gain of FIG. 18.
Figure 20:
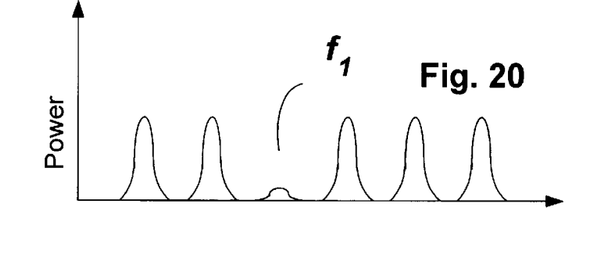
FIG. 20 shows an output spectrum where the Raman gain is used to attenuate signals.
Figure 21:
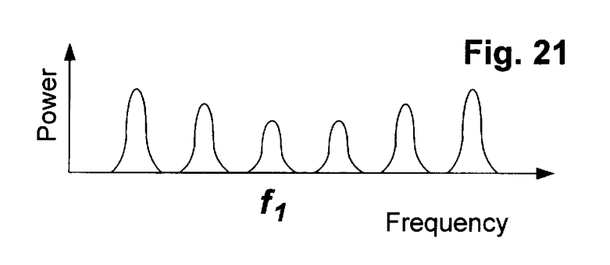
FIG. 21 shows the power output spectrum of a typical communication fiber.
Figure 22:
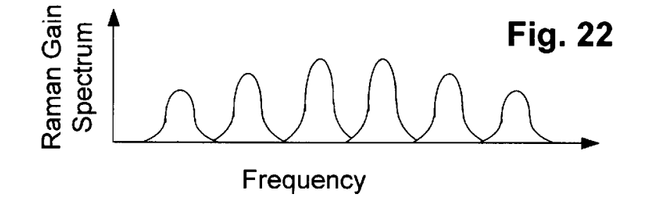
FIG. 22 shows a Raman gain curve.
Figure 23:
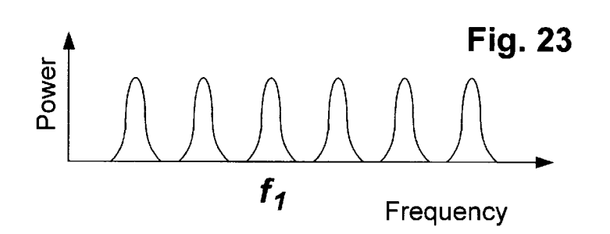
FIG. 23 shows the output spectrum of the fiber of the invention when the signals of FIG. 21 passes through the Raman gain of FIG. 22.

FIG. 20 shows an analogous spectrum to FIG. 19 where the Raman gain is used to attenuate signals at frequency $f_1$. In this case, signals at $f_1$ are suppressed. Clearly, combinations of laser pump frequencies may be used to tailor an incoming optical signal to whichever combination of amplification and/or attenuation is desired. In particular, signals such as shown in FIG. 21 may be passed through a gain section with gain shown in FIG. 22 to generate signals such as shown in FIG. 23.

Figure 24:
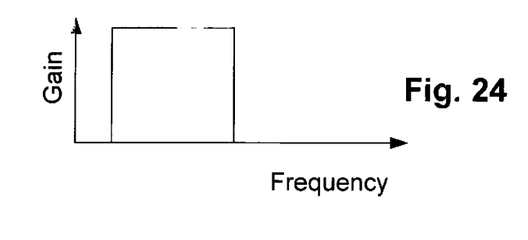
FIG. 24 shows an idealized "top hat" gain spectrum.
Figure 25:
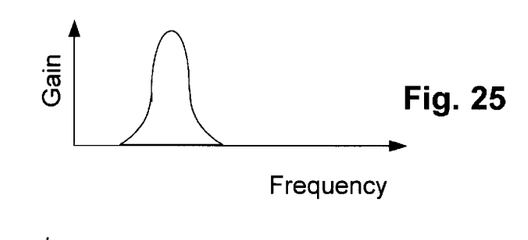
FIG. 25 shows a narrower peaked Raman gain.
Figure 26:
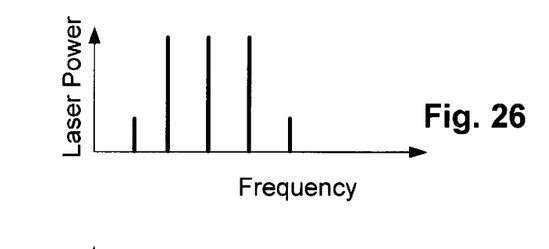
FIG. 26 shows the output of a frequency modulated laser.
Figure 27:
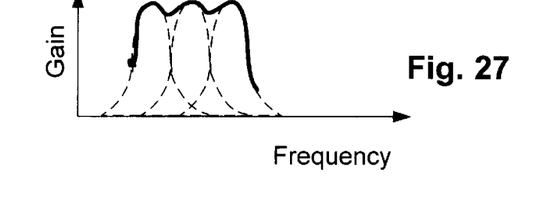
FIG. 27 shows the Raman gain for the laser of FIG. 26 and Raman gain profile of FIG. 25. a narrower peaked Raman gain.

In order to flatten the gain spectrum, a preferred implementation of this invention frequency modulates the pump wavelength in order to spread the Raman gain spectrum. In general the Raman gain profile is the convolution of the gain spectrum with the pump laser spectrum. FIGS. 25–27 illustrate how an ideal top-hat single channel gain profile shown in FIG. 24 can be approximated using a medium with a narrower peaked Raman gain shown in FIG. 25 and a frequency modulated laser. If the modulation frequency of the laser shown in FIG. 26 is approximately equal to the full-width at half maximum of the Raman line of FIG. 25, and the modulation index is set to ~1.45, prior art modulation means produces a laser spectrum with three nearly equal components separated by the full width of the Raman line. The total gain from all three components is equivalent to three Raman lines set one linewidth apart as illustrated in FIG. 27 and approximates an ideal top-hat profile. The contributions of weaker sidebands outside the gain profile may be neglected. Frequency modulation of the pump laser does not introduce amplitude modulation and noise in the Raman gain, but it is desirable for the pump and signal light to propagate through the a sufficient length of Raman amplification fiber in opposite directions to insure that each pulse of the signal encounters all possible frequencies of the pump beam. More complex multiple-frequency pump beam modulation schemes can broaden the amplification spectrum further and make its profile correspond to whatever filtering function is desired.

While this description has emphasized $H_2$ as the Raman medium, those skilled in the art will recognize that other Raman active molecules can be produced in a fluid phase which will fill the voids in a "holey" or "photonic crystal" fiber as described here. Among other potential Raman gain media are deuterium, methane, deutero-methane, carbon dioxide, and iodine vapor. Further, while this description has emphasized frequency modulation as a means of broadening the pump laser without adding noise or modulation, a steady train of short amplitude modulated laser pulses—as produced by a cw mode-locked laser—would also be part of a preferred embodiment of the current invention. In that case, it is preferably that the signal light and pump light propagate in opposite directions through a length of amplifying fiber that always contains the same number of pump laser pulses. If the number of pulses encountered by the signal light varied (for example because one pulse exited the amplifying fiber before another entered) the gain would be modulated at the pulse rate or some sub-multiple thereof which might have deleterious effects. Raman amplification of some vapors, such as iodine vapor, can be enhanced by choosing a pump radiation wavelength that approaches an optically allowed transition. Resonant Raman scattering and resonant fluorescence from such systems have been observed experimentally for many years and laser action has also been observed in free space optical cavities. Filling a holey fiber with a resonant Raman medium and providing a suitable pump wavelength to produce travelling-wave amplification is also a preferred embodiment of this invention.

Raman resonant interactions in a fluid-filled holey optical fiber can also be employed for purposes other than amplification. In particular, when the pump and signal radiation propagate in the same direction through a holey fiber Raman amplifier, the group velocities of the pump and signal wavelengths can be made substantially equal. That allows individual pulses of pump radiation to affect individual pulses of signal light. The resulting optical logic operations are also preferred embodiments of this invention. In particular, a pulse of pump light can interact with and amplify a pulse of signal light to a level that is above a pre-specified threshold. Since the signal light level cannot exceed that threshold unless the pump and signal are both present, such a device constitutes an AND gate. Modulation transfer by means from pump to signal of AND gates of this sort are preferred implementations of this invention. The same sort of modulation transfer from a modulated pump signal to a low-level cw signal beam produces an information-carrying signal wave according to a preferred embodiment of this method.

Energy contributed to a long wavelength signal wave is extracted form the short wavelength pump wave by means of the Raman amplification interaction described to this point. When the pump wavelength is longer than the signal, the inverse effect transfers energy from the signal to the pump. This phenomenon has been called "the inverse Raman effect" and is employed in other preferred implementations of this invention to attenuate specific signal bands in a way that is entirely analogous to the amplification described to this point. The attenuation level of such a system can be readjusted on nanosecond time scales to correct gain imbalances, switch communication channels on and off or perform optical logic. Those skilled in the art will note that the inverse Raman effect is capable of inverting a stream of pulses such that a high power level at the longer wavelength input creates a low power level at the short wavelength input and vice versa.

Providing two pump frequencies $f_3$ and $f_4$ to the Raman active fiber medium as shown in FIGS. 14 and 15 can induce a four-wave mixing interaction in which the presence of light at the signal wavelength $f_1$ creates a new light beam at $f_2=f_1+f_4-f_3$ with the same temporal profile as the $f_1$ input. If the difference frequency $f_3-f_4$ equals the difference between the two communication signal channels, $f_1$ and $f_2$, this four wave mixing process can transfer the signal from $f_1$ to $f_2$. In order for this process to work, the propagation constants for the four interacting waves must fulfill $k_1-k_2+k_3-k_4<\pi L_{Ram}$, where $L_{Ram}$ is the length of the Raman active fiber medium. This condition can be fulfilled in properly designed holey fiber for waves which also satisfy the Raman resonance conditions $f_3-f_1=f_4-f_2=f_R$. Those skilled in the art will recognize that other frequencies such as $f_2=f_1+f_3-f_4$ can also be produced in this process, which will have to be removed through attenuation. Also, the signal at $f_2$ is likely to be weak, requiring Raman amplification using pump wavelength $f_4$. The system of transferring the signal from one communications channel to another using Raman resonant four wave mixing in holey optical fiber with voids filled with Raman active fluid, attenuating unwanted frequency components and amplifying the desired ones constitutes a preferred embodiment of this invention.

The holes in the optical fiber may be filled with fluids such as the gases hydrogen, deuterium, methane, deutero-methane and iodine, or indeed any other gases showing sufficient Raman gain and properties to be useful. It is expected that the greatest Raman gain will be shown by hydrogen gas at a pressure of from 2 to 10 atmospheres, and such a gas filling is the most preferred embodiment. Super-critical gases, where the pressure and temperature are high enough that there is no surface between liquid and gas and no surface tension, such as $CO_2$ under high pressure, may be used. Liquids such as benzene, nitrobenzene, toluene, 1-bromonaphthalene, pyridine, cyclohexane, deuterated benzene, carbon disulfide, carbon tetrachloride, and chloroform may also be used. In general, Raman active fluids having a compound containing a vibrating group chosen from the list consisting of S—S, C—I, C—Br, C—SH, C—S, H—H, C—H, and C—C are anticipated by the inventor. Table 1 presents Raman shifts and Raman linewidths of different materials as are known to the inventor. Other gases and liquids which may exist and/or may be shown to have suitable properties for the invention which are not listed in Table 1 are explicitly anticipated by the inventor, and are explicitly covered by the following claims.

Obviously, many modifications and variations of the present invention are possible in light of the above teachings. It is therefore to be understood that, within the scope of the appended claims, the invention may be practiced otherwise than as specifically described.

TABLE 1

Raman shifts and linewidth of various gases and liquids.

| gas, liquid, or vibrating bond | Raman Shift ($cm^{-1}$) | $\Delta v$ ($cm^{-1}$) |
|---|---|---|
| hydrogen | 4155 | 0.0083 at 2.5 atmospheres |
| deuterium | 2991 | <1 |
| methane | 291.5 | ~1 |
| deutero-methane | 2084.7 | ~1 |
| iodine gas | various | ~0.03 |
| carbon dioxide | | |
| benzene | 992 | 1.8 |
| nitrobenzene | 1344 | 6.9 |
| toluene | 1004 | 1.5 |
| 1-bromonaphthalene | 1368 | |
| pyridine | 992 | |
| cyclohexane | 2852 | |
| deuterated benzene | 944 | |
| carbon disulfide | 656 | |
| carbon tetrachloride | 459 | 5 |
| chloroform | 668 | 8 |
| S-S | 445–550 | |
| C-I | 490–522 | |
| C-Br | 510–594 | |
| C-Cl | 570–650 | |
| C-SH | 600–700 | |
| C-S | 630–705 | |
| C-C | 700–1100 | |

I claim:

1. An apparatus, comprising:
a Raman amplifying gas filled optical fiber, the Raman amplifying gas filled optical fiber having an axis, the Raman amplifying gas filled optical fiber comprising a core region and a cladding region surrounding the core region, the Raman amplifying gas filled optical fiber containing one or more holes, the holes filled with a Raman active gas, wherein the density of holes and the density of gas within the holes is sufficient so that light having a first frequency $f_1$ propagating within the core region of the Raman amplifying gas filled optical fiber is amplified when the fiber is pumped with a pump laser having a second frequency $f_2$ differing from the first frequency $f_1$ by a Raman shift $f_R$ corresponding to the Raman active gas.

2. The apparatus of claim 1, where the Raman active gas is a gas containing a hydrogen isotope.

3. The apparatus of claim 2, where the hydrogen isotope is hydrogen.

4. The apparatus of claim 2, where the hydrogen isotope is deuterium.

5. The apparatus of claim 1, where the Raman active gas is methane.

6. The apparatus of claim 1, where the Raman active gas contains fluorine.

7. The apparatus of claim 1, where the holes are elongated in the direction of the fiber axis.

8. The apparatus of claim 7, where the holes have a diameter and an arrangement such that the light of the first frequency is not appreciably scattered out of the Raman amplifying gas filled optical fiber.

9. The apparatus of claim 7, where the holes are in the core of the fiber.

10. The apparatus of claim 9, where the holes have a diameter and an arrangement such that the light of the first frequency is not appreciably scattered out of the Raman amplifying gas filled optical fiber.

11. The apparatus of claim 9, wherein the one or more holes occupy substantially the center of the core of the optical fiber.

12. The apparatus of claim 7, where the holes are in the cladding of the fiber.

13. The apparatus of claim 12, where the holes have a diameter and an arrangement such that the light of the first frequency is not appreciably scattered out of the Raman amplifying gas filled optical fiber.

14. The apparatus of claim 12, wherein the holes are arranged symmetrically around the core of the fiber.

15. An apparatus, comprising:
a Raman amplifying gas filled optical fiber, the Raman amplifying gas filled optical fiber having an axis, the Raman amplifying gas filled optical fiber comprising a core region and a cladding region surrounding the core region, the Raman amplifying gas filled optical fiber containing holes, the holes filled with a Raman active gas, the Raman active gas containing a hydrogen isotope, wherein the density of holes and the density of gas within the holes is sufficient so that light having a first frequency propagating within the core region of the Raman amplifying gas filled optical fiber is amplified when the fiber is pumped with a pump laser having a second frequency differing from the first frequency by a Raman shift corresponding to the Raman active gas.

16. A system, comprising:
a Raman amplifying gas filled optical fiber, the Raman amplifying gas filled optical fiber having an axis, the Raman amplifying gas filled optical fiber comprising a core region and a cladding region surrounding the core region, the Raman amplifying gas filled optical fiber containing holes, the holes filled with a Raman active gas, wherein the density of holes and the density of gas within the holes is sufficient so that light having a first frequency propagating within the core region of the Raman amplifying gas filled optical fiber is amplified when the fiber is pumped with a pump laser having a second frequency differing from the first frequency by a Raman shift corresponding to the Raman active gas;

a laser for producing light of the second frequency;

optical means for introducing light from the laser into the Raman amplifying gas filled optical fiber; and optical means for introducing light of the first frequency into the Raman amplifying gas filled optical fiber.

17. The system of claim 16, further comprising;

an optical fiber for conducting light of the first frequency; wherein the optical means for introducing light of the first frequency is a connection between the optical fiber and the Raman amplifying gas filled optical fiber;

a first laser for producing light of the first frequency; and optical means for introducing light of the first frequency into the optical fiber.

18. A method of controlling light of a particular frequency band having a frequency $f_1$ in an optical communication system comprising the steps of:

(a) providing a length of optical fiber having a core region and a cladding region, the optical fiber it containing voids filled with gas the voids positioned along the fiber such that the electric field amplitude of the light of frequency $f_1$ guided by the core region penetrates at least some of the void regions to a substantial extent, wherein the gas has at least one Raman active vibrational, rotational or vibronic transition having a particular Raman frequency shift $f_R$;

(b) providing pump radiation with a nominal frequency $f_P$ differing from $f_1$ by the amount of the Raman frequency shift $f_R$, the pump radiation having a pump spectrum tailored to transfer power between the radiation at frequency $f_P$ and $f_1$ by stimulated Raman gain with a desired profile over the particular frequency band, the pump radiation having power sufficient to transfer substantial power between the radiation at frequency $f_P$ and $f_1$ over the length of optical fiber;

(c) providing a means to couple the light of frequency $f_1$ into and out of the length of optical fiber;

(d) providing a means to couple the pump radiation into the length of optical fiber;

whereby the light of frequency $f_1$ input into the fiber is controlled with a profile determined by a convolution of the pump radiation spectrum and Raman gain spectrum of the gas.

19. The method of claim 18 wherein the Raman active gas is chosen from the list of gases consisting of hydrogen, deuterium, methane, deutero-methane and iodine.

20. The method of claim 18 wherein the Raman active gas is a compound containing a vibrating group chosen from the list consisting of S—S, C—I, C—Br, C—SH, C—S, and C—C.

21. The method of claim 18 wherein the pump radiation is provided by a pump laser, the pump laser having its frequency spectrum broadened and tailored by phase modulation provided by a phase modulator system operating at one or more modulation frequencies.

22. The method of claim 18 wherein the pump radiation is tunable.

23. The method of claim 18 wherein the pump radiation and the light in the particular frequency band propagate in the fiber in opposite directions.

24. The method of claim 18 wherein the pump radiation comprises a steady CW train of mode locked laser pulses having a repetition period much shorter than the time required for signal radiation to propagate through the length of optical fiber, the mode locked pulses having an inverse pulse-width comparable to a desired amplification bandwidth.

25. The method of claim 18 wherein the photon energy of the pump radiation is tuned to a region of a coupled energy level of the gas, thereby resonantly enhancing the strength of the Raman gain process.

26. The method of claim 18; wherein the pump radiation comprises light of a plurality of pump frequencies, each pump frequency being shifted from the frequency of light in a different communications band by the Raman frequency shift of the gas.

27. The method of claim 26, wherein the power and the spectra of the pump radiation for at least one of the different communication bands is individually controlled to control the output power and spectra of the at least one different communication band.

28. The method of claim 27, wherein the unamplified output levels of the different communication bands is reduced to less than a specified threshold by fixed attenuating elements.

29. The method of claim 18 wherein the pump radiation is amplitude modulated and the light in the particular frequency band is unmodulated having a power below a pre-defined threshold, wherein the modulation pattern of the pump radiation is transferred to the light of the particular frequency band so that the modulated power of the light of the particular frequency band is raised above the pre-defined threshold.

30. The method of claim 18 wherein optical logic operations are performed by co-propagating pulses of light of the defined frequency band and pulses of pumping radiation in the optical fiber.

31. The method of claim 30, wherein the optical logic is an AND operation.

32. The method of claim 18, wherein the light of frequency $f_1$ is controlled by Raman amplification in the optical fiber.

33. The method of claim 18, wherein the light of frequency $f_1$ is controlled by Raman attenuation in the optical fiber.

34. A method of controlling light of a particular frequency band having a frequency $f_1$ in an optical communication system comprising the steps of:

(a) providing pump radiation of frequencies $f_4$ and $f_3$;

(b) providing a length of optical fiber having a core region and a cla containing voids filled with a Raman active gas, the voids positioned along the fiber such that the electric field amplitude of the light of frequency $f_1$ guided by the core region penetrates at least some of the void regions to a substantial extent, wherein the gas has a substantial non linear index of refraction, wherein the pump radiation has power sufficient to transfer substantial power between the radiation at frequencies $f_1$ and $f_2=f_4-f_3+f_1$ over the length of optical fiber, and wherein phase velocities in the optical fiber of waves having frequencies $f_1$, $f_3$, $f_4$ and $f_2$ are such that the coherence length for the four wave mixing process that produces a non linear polarization in the gas at the frequency $f_2$ is greater than one half the fiber length;

(c) providing a means to couple the light of frequency $f_1$ into the length of optical fiber; and (d) providing a means to couple, the pump radiation into the length of optical fiber.

* * * * *